United States Patent [19]

Copeland et al.

[11] Patent Number: 4,864,154
[45] Date of Patent: Sep. 5, 1989

[54] SYSTEM FOR AUTOMATICALLY SHUTTING DOWN AUXILIARY POWER DEVICES IN A VEHICLE

[75] Inventors: Hugh D. Copeland, 521 Halsey St., Chula Vista, Calif. 92010; David C. Pease, Jr., Chula Vista, Calif.

[73] Assignee: Hugh D. Copeland, Chula Vista, Calif.

[21] Appl. No.: 283,788

[22] Filed: Dec. 13, 1988

[51] Int. Cl.$^4$ ............................................... H02G 3/00
[52] U.S. Cl. ..................................... 307/10.7; 307/39
[58] Field of Search ............... 307/10 LS, 10 BT, 38, 307/39, 10.7

[56] References Cited

U.S. PATENT DOCUMENTS

| 3,374,394 | 3/1968 | Miller | 307/10 BP |
| 3,723,752 | 3/1973 | Russell | 307/10 BP |
| 4,218,717 | 8/1980 | Shuster | 307/10 BP X |

Primary Examiner—William M. Shoop, Jr.
Assistant Examiner—Sharon D. Logan
Attorney, Agent, or Firm—Baker, Maxham, Jester & Meador

[57] ABSTRACT

A solid state digital and analog circuit which is connected between a two-way radio, public address system etc. and the battery in a police car, emergency vehicle, tow truck or fire truck to prevent the same from inadvertently draining all the power from the battery when the vehicle is left unattended for long periods of time. When the ignition is turned off, a timer in the circuit begins counting and after a prescribed amount of time, e.g. between one and twelve hours, a relay disconnects the auxiliary equipment from high current of the battery. When the ignition is turned on the circuit immediately re-connects the auxiliary equipment and the battery.

10 Claims, 1 Drawing Sheet

U.S. Patent
Sep. 5, 1989
4,864,154
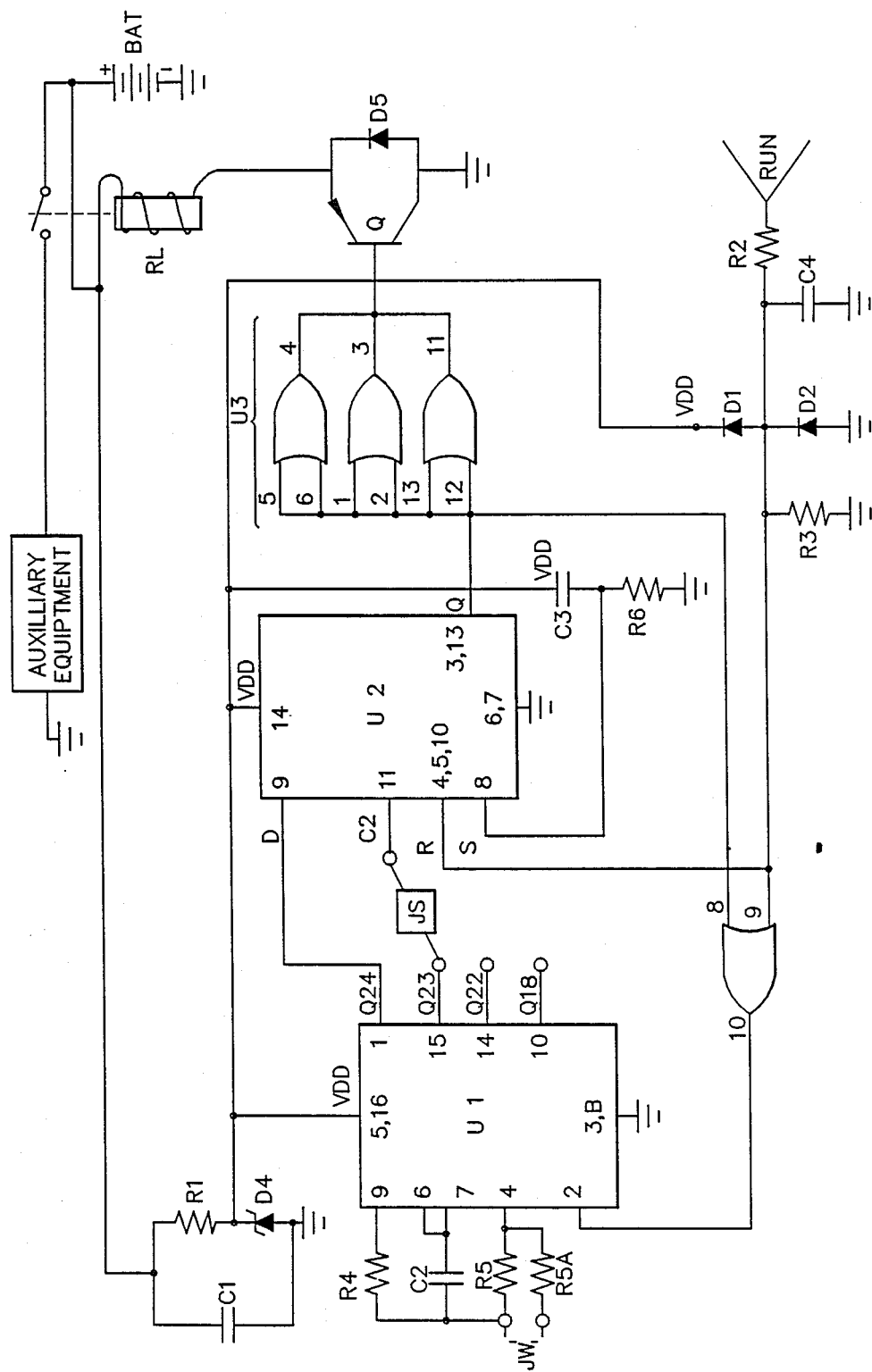

SYSTEM FOR AUTOMATICALLY SHUTTING DOWN AUXILIARY POWER DEVICES IN A VEHICLE

BACKGROUND OF THE INVENTION

The present invention relates to vehicle electrical systems, and more particularly, to a system for automatically disconnecting radios and other auxiliary equipment in cars and trucks from their batteries to prevent the same from going dead when they are left unattended for long periods of time.

Many vehicles, particularly police cars, emergency vans, wrecking trucks and fire engines, contain auxiliary equipment including two-way radios and public address systems. These are normally not switched on and off by the vehicle ignition so that they can be used when the vehicle ignition has been turned off. It often goes unnoticed that such auxiliary equipment has been left on at the end of the day when the vehicle is parked and the operator goes off duty. A public address system on a vehicle may be quietly idling. If there is nothing happening at a dispatch desk, a two-way radio may be silent. The same is true of a cellular telephone. Even if the operator remembers to switch off the radio, he or she may forget to shut off another piece of auxiliary equipment. All the auxiliary equipment can be tied to the battery through a manual master switch, but again, the operator has to remember to turn it off. Because of the foregoing, it is not uncommon for an operator to find that the battery of his or her vehicle has been completely drained of power when he or she returns after a weekend. The vehicle must then receive a jump start before it can be used.

It would be desirable to automatically disconnect such equipment from the battery. However, such disconnection should only occur when the equipment is not being used, and not likely to be used. Frequently policemen monitor their two-way radios when outside their parked vehicles, e.g. at the scene of a crime. Furthermore, any automatic disconnection should not be permanent, but instead should include automatic reconnection so that the operator can simply turn on the vehicle ignition and thereafter use all the auxiliary equipment in normal fashion.

SUMMARY OF THE INVENTION

It is therefore the primary object of the present invention to provide a system for automatically disconnecting radios and other auxiliary equipment in cars and trucks from their batteries to prevent the same from going dead.

The illustrated embodiment of my invention comprises a solid state digital and analog circuit which is connected between the auxiliary equipment and the vehicle battery. When the ignition is turned off, a timer in the circuit begins counting and after a prescribed amount of time, e.g. between one and twelve hours, a relay disconnects the auxiliary equipment from high current of the battery. When the ignition is turned on the circuit immediately re-connects the auxiliary equipment and the battery.

Thus, in accordance with my invention a system is provided for automatically disconnecting a radio and/or other auxiliary equipment in a vehicle from its battery to prevent it from going dead when the vehicle is left unattended for a substantial period of time. The system is connected to the vehicle so that a power down signal is provided which is representative of the ignition system of the vehicle being turned off. Similarly, a power up signal is provided by such connection which is representative of the ignition system being turned on. The system includes a counter responsive to the power down signal for determining when a predetermined amount of time has elapsed from the occurrence of the power down signal. The predetermined amount of time may be adjusted in the system. The system further includes a relay for connecting and disconnecting the battery and the auxiliary equipment. A driver which is responsive to the counter actuates the relay to disconnect the battery from the auxiliary equipment when the predetermined amount of time has elapsed. The driver reconnects the battery to the auxiliary equipment in response to the power up signal.

BRIEF DESCRIPTION OF THE DRAWING

The drawing is a schematic diagram of a preferred embodiment of the subject invention.

DESCRIPTION OF THE PREFERRED EMBODIMENT

Referring to the drawing, the illustrated circuit is connected to a suitable "hot wire" in the ignition at "RUN" in the lower right corner of the drawing. This provides the circuit with power down and power up signals. Power is applied to the network consisting of D4, R1 and C1. The purpose of this network is to condition and limit the voltage applied to the remainder of the circuit. Diode D4 is a zener diode nominally rated at thirteen volts. The network of D4 and R1 limit the applied voltage to thirteen volts, which allows use with battery voltages up to thirty volts. Capacitor C1 is a noise filter. The output of this network is applied to integrated circuits U1, U2 and U3.

U1 is a twenty-four stage binary counter with provisions for implementation of an R-C oscillator. The oscillator frequency is determined by the product of R5 and C2. R5A is selectable via jumper switch JW. With the jumper in the short range position, R5 and R5A are paralleled, halving the effective resistance R, which doubles the frequency, and which halves the time-out range.

The output of U1 is fed to U2, which is a D type flip flop. Q24 is fed to the D-input and the clock input is taken from either Q18, 22 or 23 providing time selection within the range determined by the position of the jumper switch JS. The clock input causes the state of the D-input to be placed on the Q output, which is then fed to U3.

U3 is a quad 2-input OR-gate. Three-quarters of U2 is used to drive the output transistor Q, which is a PNP power device for controlling an external relay RL. Diode D5 is to help protect from inductive kickback, which occurs when the relay coil is de-energized.

When U2 toggles Q to a "1" state, the signal is also passed through U3 to the reset on U1, which not only resets all outputs, but causes the oscillator to stop. This positive signal is also passed to the base of the power transistor, which turns off, de-energizing the relay RL. R6 and C3 form a reset network which ensures initialization to a known condition (OFF) when battery power is applied to the timer.

D1 and D2 form a protective network for signal line attachment. This is incorporated into the input network of R2, R3 and C4. This terminal is attached to a power source that is only energized when the ignition or run switch is in the run mode. When this line is at battery voltage a true signal is applied to the reset lines of U1 and U2. This keeps U1 from counting and ensures that U2 has a false, or "0" on the Q output. This in turn keeps the output transistor base at zero volts, maintaining full current through the transistor. D1 prevents the battery voltage, which could be as high as thirty volts, from damaging the timer circuitry. R2 serves as a current limiter for D1.

When the "RUN" signal is removed (power down signal), i.e. when the vehicle ignition is turned off, the reset signals are removed from U1 and U2, allowing the timer to begin timing out. If the signal power up is applied to the "RUN" input during this timing period, U1 and U2 are reset to a zero count condition until the voltage applied to "RUN" is removed again (power down signal).

By way of example, timer U1, flip flop U2 and quad OR-gate U3 may be provided by part numbers MC14521B, MC14013B and MC14071B, respectively, from Motorola, Inc. Zener diode D4 may be part number 1N964, diode D5 may be a 1N4001 and the PNP output transistor may be part number TIP115.

The circuit in the drawing is designed to drive a continuous duty relay with a coil current of one amp or less. The desired auxiliary equipment is powered through the contacts of the relay, and is automatically switched off after the selected time following ignition shut off is reached. The illustrated circuit does not start timing until the reset signal is removed. This reset signal is wired to a hot lead controlled by the ignition switch on the vehicle which remains hot until the ignition is turned off. If desired, the relay RL may drive a slave relay which actually switches the battery power to and from the auxiliary equipment. The circuit always powers up in a known state-OFF. This is important during initial installation, changing of the vehicle battery, or other power interruption. This also contributes to the reliability and survivability of the circuit. After installation, the relay RL will not energize until the ignition is turned on. The circuit itself draws negligible current. My system can be operated within a wide range of voltages, e.g. between five and thirty volts. The timing increments are insensitive to the applied voltage.

While a preferred embodiment of my automatic shut down system has been described in detail, it should be understood that modifications and adaptations thereof will occur to persons skilled in the art. For example, the jumper switch JS may be replaced with a slide switch or other suitable means for setting the predetermined shutdown delay. The increments maybe four hours, five hours, six hours, eight hours, ten hours and twelve hours or any other increments suitable for the environment. Therefore, the protection afforded my invention should only be limited in accordance with the scope of the following claims.

I claim:

1. A system for automatically disconnecting a radio and/or other auxiliary equipment in a vehicle from its battery to prevent it from going dead when the vehicle is left unattended for a substantial period of time, comprising:
    means for providing a power down signal representative of an ignition system of the vehicle being turned off;
    means for providing a power up signal representative of the ignition system being turned on;
    counter means responsive to the power down signal for determining when a predetermined amount of time has elapsed from the occurrence of the power down signal;
    means for adjusting the predetermined amount of time;
    relay means for connecting and disconnecting the battery and auxiliary equipment;
    driver means responsive to the counter means for actuating the relay to disconnect the battery from the auxiliary equipment when the predetermined amount of time has elapsed; and
    means for causing the driver means to reconnect the battery to the auxiliary equipment in response to the power up signal.

2. A system according to claim 1 wherein the counter means includes a binary counter.

3. A system according to claim 2 wherein the means for adjusting the predetermined amount of time includes a switch for selecting one of a plurality of outputs of the binary counter.

4. A system according to claim 1 wherein the means for adjusting the predetermined amount of time includes an R-C oscillator.

5. A system according to claim 4 wherein the means for adjusting the predetermined amount of time includes a switch for selecting one of a plurality of resistors in the R-C oscillator.

6. A system according to claim 1 wherein the driver means includes a power transistor.

7. A system according to claim 6 wherein the driver means further includes a plurality of OR gates having a plurality of commonly connected inputs and a plurality of outputs connected to a base of the power transistor.

8. A system according to claim 1 wherein the driver means further includes a diode connected between an emitter and a collector of the power transistor in order to provide protection against inductive kickback which occurs when the relay means is de-actuated to reconnect the battery to the auxiliary equipment.

9. A system according to claim 1 and further comprising means for conditioning and limiting a voltage from the battery which is applied to the counter means.

10. A system according to claim 1 wherein the means for causing the driver means to reconnect the battery to the auxiliary equipment includes a flip flop circuit connected between the counter means and the driver means.

* * * * *